(12) United States Patent
Endoh

(10) Patent No.: US 6,922,651 B2
(45) Date of Patent: Jul. 26, 2005

(54) ON-BOARD SENSOR INFORMATION PROVIDING PROGRAM AND ON-BOARD SENSOR INFORMATION USING PROGRAM

(75) Inventor: Toshio Endoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 39 days.

(21) Appl. No.: 10/329,437

(22) Filed: Dec. 27, 2002

(65) Prior Publication Data

US 2003/0216880 A1 Nov. 20, 2003

(30) Foreign Application Priority Data

May 16, 2002 (JP) ........................................ 2002-142023

(51) Int. Cl.⁷ .............................................. G06F 19/00
(52) U.S. Cl. ...................... 702/122; 702/104; 702/121; 702/122; 702/188; 340/500; 340/933; 701/200; 701/300
(58) Field of Search ...................... 702/104, 116–123, 702/188, 189; 340/933, 500; 701/200, 300

(56) References Cited

U.S. PATENT DOCUMENTS 5,274,636 A * 12/1993 Halter et al. ................. 370/212
6,161,071 A * 12/2000 Shuman et al. ............... 701/48

OTHER PUBLICATIONS

Setchell et al., 'Vision–based road traffic monitoring sensor', Feb. 2001, IEEE, pp. 78–84.*

Singer et al., 'A Fault–tolerant Sensory Diagnostic System for Intelligent Vehicle Application', Sep. 1995, IEEE, pp. 176–182.*

* cited by examiner

Primary Examiner—Marc S. Hoff
Assistant Examiner—Elias Desta
(74) Attorney, Agent, or Firm—Staas & Halsey LLP (57) ABSTRACT

A controller obtains sensor information from sensors mounted on a vehicle running on a road, and an information offer selector allows the driver of the vehicle to select on a screen whether to provide the sensor information to a center apparatus. If the driver allows provision of the sensor information, then the sensor information is transmitted to the center apparatus via radio communications. Thus, only the sensor information that is allowed by the driver is provided to the other vehicles.

31 Claims, 10 Drawing Sheets

| OWNER'S NAME | PASSWORD | VEHICLE ID |
|---|---|---|
| TARO NIPPON | ABC138970 | 2180 |
| ICHIRO YAMADA | VBF908975 | 5789 |

FIG.6

| VEHICLE ID | DEVICES INSTALLED ON ROAD | POSITION |
|---|---|---|
| 2180 | - - - - | N43.15,E135.36 |
| 5789 | - - - - | N43.89,E135.45 |
| - - - - | VEHICLE SPEED MEASURING DEVICE $30_1$ | N43.45,E135.56 |
| - - - - | VEHICLE SPEED MEASURING DEVICE $30_n$ | N43.01,E135.26 |
| - - - - | DETECTION TARGET DISPLAY $40_1$ | N43.45,E135.66 |
| - - - - | DETECTION TARGET DISPLAY $40_n$ | N43.05,E135.96 |

FIG.7

| VEHICLE ID | SENSOR | RELIABILITY | POINT GIVING RATE | PROVIDING TIME (MIN.) | POINT SUB-TOTAL | POINT TOTAL |
|---|---|---|---|---|---|---|
| 2180 | POSITION SENSOR | 0.9 | 90 | 10 | 900 | 4800 |
| | OWN VEHICLE SPEED SENSOR | 0.9 | 90 | 10 | 900 | |
| | VISIBLE SENSOR | 0.3 | 30 | 10 | 300 | |
| | INFRARED RADIATION SENSOR | 0.9 | 90 | 10 | 900 | |
| | OTHER VEHICLE SPEED SENSOR | 0.9 | 90 | 10 | 900 | |
| | OTHER SENSOR GROUP | 0.9 | 90 | 10 | 900 | |

ON-BOARD SENSOR INFORMATION PROVIDING PROGRAM AND ON-BOARD SENSOR INFORMATION USING PROGRAM

BACKGROUND OF THE INVENTION

1) Field of the Invention

The present invention relates to a technology for providing information from various sensors mounted on a vehicle to other vehicles. More particularly, this invention relates to ensuring reliability of the sensor information.

2) Description of the Related Art

A high-level road traffic system is now under development with an object to solve traffic problems such as the traffic accidents and traffic jams. In this road traffic system, people, roads, and vehicles are connected by a network, using the state-of-the-art information communication technology.

The running support system is an example of the high-level road traffic system. In this running support system, various sensors such as the visible sensors, infrared radiation sensors, millimeter-wave sensors are installed on the road and information such as speed, distance, road information, and information about obstacles obtained by the sensors is transmitted to the vehicles that are running on the road. However, huge cost is required if the sensors are to be installed on all the roads.

A running support system that reduces the cost by reducing the number of sensors is known. In this system, sensors are mounted on the vehicles and the number of sensors installed on the road is reduced to minimum. In this running support system, if a vehicle is parked on the road, the position sensor mounted on that vehicle transmits the position of that vehicle to other vehicles. Thus, the drivers of the other vehicles will know that a vehicle has been parked on the road and they will take care while driving which shall lead to prevention of accidents.

Thus, to lower the cost, conventionally, it is necessary to mount sensors on the vehicles, moreover, the information obtained by the sensors mounted on a vehicle is transmitted to the other vehicles without driver intervention. As a result, there is a problem that personal information of the vehicles is transmitted to the other vehicles without the permission and/or knowledge of the drivers. Therefore, the drivers or the owners of the vehicles were reluctant to install the sensors on their vehicles.

On the other hand, it is necessary for road administrators to provide reliable sensor information with respect to many and unspecified vehicles, from a standpoint of supporting safe driving. However, conventionally, there is no means for verifying the reliability of sensor information collected from respective vehicles. Hence, it has been difficult to provide sensor information having high reliability, which becomes a barrier in developing the running support system.

SUMMARY OF THE INVENTION

According to one aspect of the present invention, sensor information is obtained from sensors mounted on a vehicle running on a road. A driver of the vehicle is allowed to select whether to provide the sensor information to an external apparatus. If the driver allows provision of the sensor information, only then the sensor information is transmitted to the external apparatus.

According to another aspect of the present invention, reliability of the sensor information provided from the vehicle to the external apparatus is calculated based on certain reference information. Moreover, the sensor information that is found to be reliable is used to control running of the vehicle on a road.

These and other objects, features and advantages of the present invention are specifically set forth in or will become apparent from the following detailed descriptions of the invention when read in conjunction with the accompanying drawings.

DETAILED DESCRIPTIONS

Exemplary embodiment(s) of the on-board sensor information providing program and the on-board sensor information using program according to the present invention will be explained in detail, with reference to the drawings.

Figure 1:
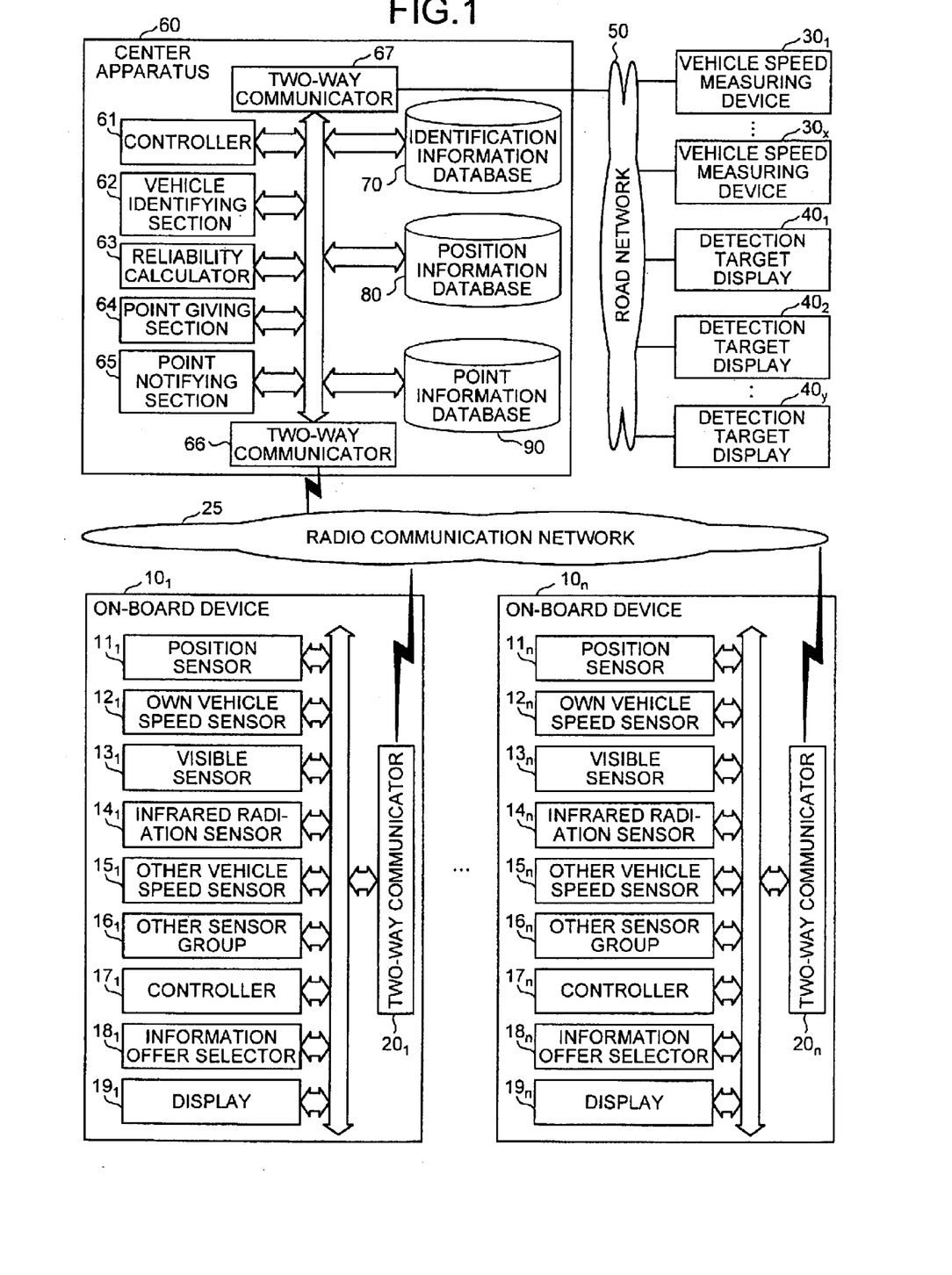
FIG. 1 is a block diagram that shows a configuration of an embodiment according to the present invention.

FIG. 1 is a block diagram that shows the configuration of the embodiment according to the present invention. The running support system is shown in this figure. In the figure, each of on-board devices $10_1$ to $10_n$ is a device respectively mounted on n vehicles, which has functions to measure position, speed and the like, and provide these, as (on-board) sensor information, to a center apparatus 60 described later and other on-board devices via a radio communication network 25.

The on-board device $10_1$ is mounted on a specific vehicle (hereinafter "own vehicle") 100, which travels on a road 200 respectively shown in FIG. 2 to FIG. 4. In this on-board device $10_1$, a position sensor $11_1$ receives radio waves from three satellites of 24 satellites, from which it is easiest to receive the radio waves, by GPS (Global Positioning System), to measure the position of the own vehicle 100 (see FIG. 2 to FIG. 4), and outputs the position as position information.

A vehicle speed sensor mounted on the own vehicle (hereinafter "own vehicle speed sensor") $12_1$ measures the running speed of the own vehicle 100, and outputs it as own vehicle speed information. A visible sensor $13_1$ detects a detection target (display, other vehicle, road surface, etc.) in the range of wavelength of the visible light, and outputs visible detection information. An infrared radiation sensor $14_1$ detects a detection target (display, other vehicle, road surface, etc.) in the range of wavelength of the infrared rays, and outputs infrared detection information.

Different vehicle speed sensor $15_1$ measures the running speed of another vehicle other than the own vehicle 100, and outputs it as other vehicle speed information. Other sensor group $16_1$ includes a curvature sensor, a millimeter-wave sensor, a position sensor and the like, and measures sensor information other than the sensor information (position information, own vehicle speed information, visible detection information, infrared detection information, and other vehicle speed information), and outputs these information.

The other sensor information includes curvature information relating to a curvature of the road, calculated from an angle of the steering wheel, equipment state information relating to the state of on-board equipment such as lights, an air conditioning system, and wipers, lane mark information relating to a lane mark (lane position), and other vehicle position information relating to the position of another vehicle.

A controller $17_1$ is for controlling respective sections. The details of the operation of the controller $17_1$ will be described later. An information offer selector $18_1$ has a function of allowing a driver to select whether to provide each sensor information from a position sensor $11_1$, ..., another sensor group $16_1$ to the center apparatus 60 and other vehicles.

A display $19_1$ displays an offer selection screen 300 (see FIG. 14) and a point notification screen 400 (see FIG. 15) and the like described later, under control of the controller $17_1$. A two-way communicator $20_1$ controls two-way communication between the center apparatus 60 and other on-board devices, in accordance with a predetermined communication protocol.

Figure 4:
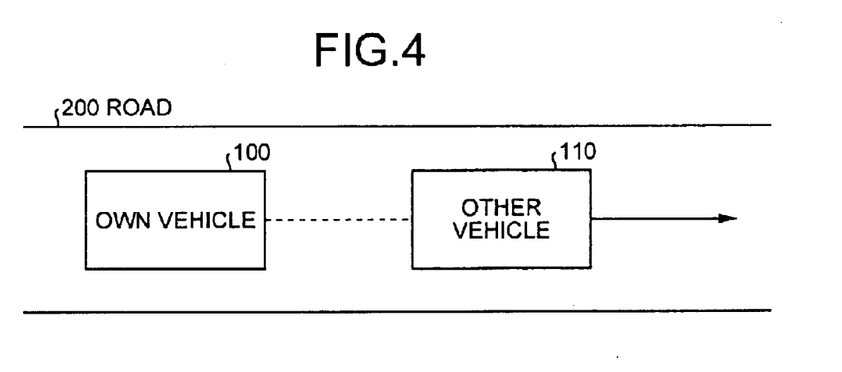

An on-board device $10_n$ is mounted on the other vehicle 110 shown in FIG. 4, in the same manner. The other on-board device has the same configuration as that of the on-board device $10_1$.

The on-board device $10_n$ has the same configuration as that of the on-board device $10_1$. In other words, in the on-board device $10_n$, a position sensor $11_n$ measures a position (latitude and longitude) of the other vehicle 110 (FIG. 4) by GPS and outputs the position as position information.

An own vehicle speed sensor $12_n$ measures the running speed of the own vehicle (in this case, the other vehicle 110), and outputs it as own vehicle speed information. A visible sensor $13_n$ detects a detection target (display, other vehicle, road surface, etc.) in the range of wavelength of the visible light, and outputs visible detection information. An infrared radiation sensor $14_n$ detects a detection target (display, other vehicle, road surface, etc.) in the range of wavelength of the infrared rays, and outputs infrared detection information.

An vehicle speed sensor mounted on another vehicle (hereinafter "other vehicle speed sensor") $15_n$ measures the running speed of another vehicle other than the other vehicle 110, and outputs it as other vehicle speed information. Other sensor group $16_n$ includes a curvature sensor, a millimeter-wave sensor, and a position sensor, and measures other sensor information and outputs this information.

A controller $17_n$ is for controlling respective sections. An information offer selector $18_n$ has a function of allowing a driver to select whether to provide each sensor information from a position sensor $11_n$, ..., another sensor group $16_n$ to the center apparatus 60 and other vehicles.

A display $19_n$ displays an offer selection screen 300 (see FIG. 14) and a point notification screen 400 (see FIG. 15) and the like described later, under control of the controller $17_n$. A two-way communicator $20_n$ controls two-way communication between the center apparatus 60 and other on-board devices, in accordance with a predetermined communication protocol via a radio communication network 25.

Figure 2:
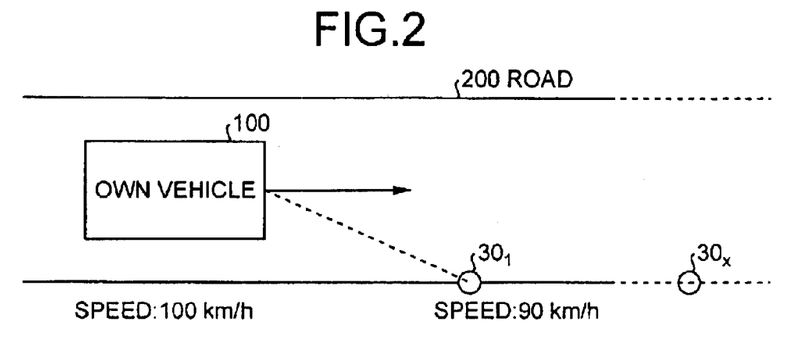
FIG. 2 shows how vehicle speed measuring devices $30_1$ to $30_x$ shown in FIG. 1 are installed on the road.

Each of vehicle speed measuring devices $30_1$ to $30_x$ is installed alongside the road 200 shown in FIG. 2, measures the running speed of a vehicle (in this figure, the own vehicle 100) running on the road 200, and transmits this measurement result to the center apparatus 60 as the sensor information, via a road network 50.

The sensor information from these vehicle speed measuring devices $30_1$ to $30_x$ is used in the running support system, together with the sensor information from the on-board devices $10_1$ to $10_x$. For example, the sensor information is used as a reference, when the reliability of the sensor information provided from the vehicle is calculated.

Figure 3:
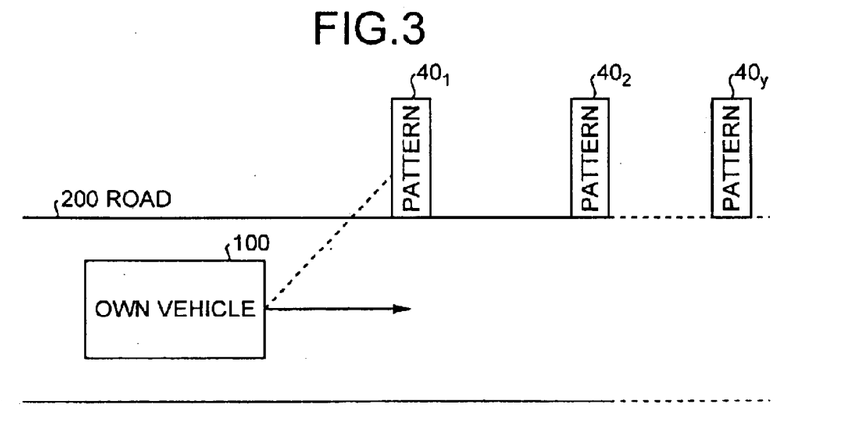
FIG. 3 shows how detection target displays $40_1$ to $40_y$ shown in FIG. 1 are installed on the road, FIG. 4 explains how the speed of a vehicle measured.

Each of detection target displays $40_1$ to $40_y$ is installed alongside the road 200 shown in FIG. 3, and displays a pattern detected by the visible sensor, the infrared radiation sensor and the like mounted on the vehicle (in this figure, the own vehicle 100) running on the road 200, based on the instruction from the center apparatus 60.

Each pattern is used as a reference, when the reliability of the sensor information from the visible sensor and the infrared radiation sensor on the vehicle is calculated. In the example shown in FIG. 3, the pattern closer to the position of the own vehicle 100 is displayed in a larger scale, and as the pattern is drawn away from the position thereof, it is displayed in a smaller scale.

The center apparatus 60 is provided in the center, and is a sensor information using apparatus, which collects sensor information from the on-board devices $10_1$ to $10_n$, calculates the reliability of the sensor information, gives points (an incentive) to the provider of the sensor information, notifies the points, and uses the sensor information.

In the center apparatus 60, a controller 61 is for controlling respective sections. The details of the operation of the controller 61 will be described later. A vehicle identifying section 62 identifies a vehicle (owner's name) based on identification information (password and vehicle ID) respectively transmitted from the on-board devices $10_1$ to $10_n$.

A reliability calculator 63 calculates the reliability of sensor information provided from each of the on-board devices $10_1$ to $10_n$. The method of calculating the reliability will be described later. A point giving section 64 gives points to an information provider (owner or driver of the vehicle), corresponding to the providing time and the reliability of the sensor information. These points are used for various privileges such as discount for the toll of the system, discount for the toll of the road, and exchange for premiums or cash.

A point notifying section 65 has a function of notifying the information provider of points given by the point giving section 64. A two-way communicator 66 controls two-way communication between on-board devices $10_1$ to $10_n$ in accordance with a predetermined communication protocol, via the radio communication network 25.

A two-way communicator 67 controls the two-way communication between the vehicle speed measuring devices $30_1$ to $30_x$ and the detection target displays $40_1$ to $40_y$, in accordance with a predetermined communication protocol, via the road network 50.

Figure 5:
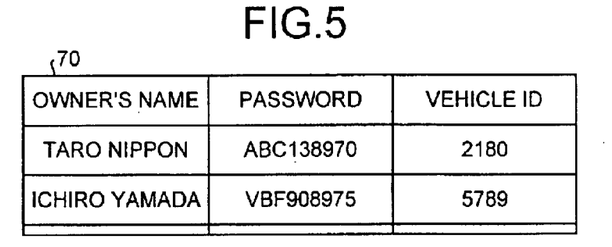
FIG. 5 shows contents, in a tabular form, of an identification information database 70 shown in FIG. 1.

An identification information database 70 is a database for storing identification information for identifying a vehicle (owner's name). Specifically, the identification information database 70 comprises, as shown in FIG. 5, fields of "owner's name", "password" and "vehicle ID".

The "owner's name" is a name of the owner (driver) of the vehicle. The "password" is used for authentication. The "vehicle ID" is an identifier for identifying a vehicle, and is used for authentication.

Returning to FIG. 1, a position information database 80 is a database for storing position information relating to the respective positions of respective vehicles and devices installed on the road (the vehicle speed measuring devices $30_1$ to $30_x$ and the detection target displays $40_1$ to $40_y$).

Figure 6:
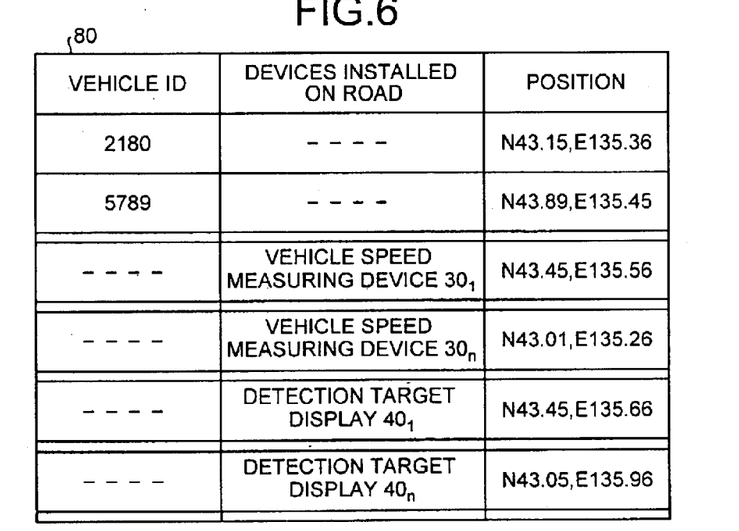
FIG. 6 shows contents, in a tabular form, of a position information database 80 shown in FIG. 1.

Specifically, the position information database 80 comprises, as shown in FIG. 6, fields of "vehicle ID", "devices installed on the road" and "position". The "vehicle ID" corresponds to "vehicle ID" shown in FIG. 5. The "devices installed on the road" denote each of the vehicle speed measuring devices $30_1$ to $30_x$ and the detection target displays $40_1$ to $40_y$.

The "position" is expressed by latitude and longitude, and denotes the current position of each vehicle, or installed positions of the vehicle speed measuring devices $30_1$ to $30_x$ and the detection target displays $40_1$ to $40_y$. The current position of each vehicle is updated by the controller 61, every time when the position information is provided from the on-board devices $10_1$ to $10_n$.

Returning to FIG. 1, a point information database 90 is a database for storing point information relating to points given corresponding to the reliability and the providing time of the provided sensor information.

Figure 7:
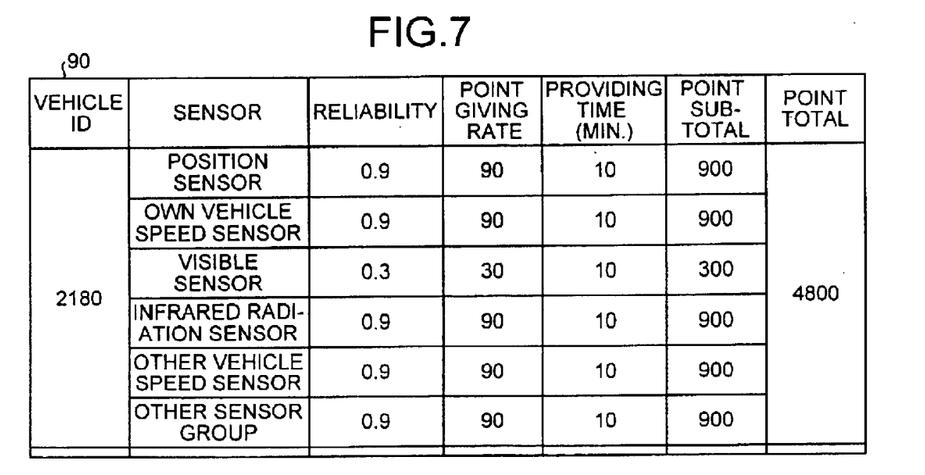
FIG. 7 shows contents, in a tabular form, of a point information database 90 shown in FIG. 1.

Specifically, as shown in FIG. 7, the point information database 90 comprises fields of "vehicle ID", "sensor", "reliability", "point giving rate", "providing time", "point sub-total" and "point total".

The "vehicle ID" corresponds to "vehicle ID" shown in FIG. 5. The "sensor" denotes various sensors mounted on a vehicle (for example, position sensor $11_1$, . . . , and other sensor group $16_1$).

The "reliability" denotes reliability of the sensor information from the above sensors. The "reliability" is a ratio of the sensor information to the reference sensor information, and is set such that 1.0 is the highest (having highest reliability).

The "point giving rate" is a value obtained by multiplying the "reliability" by 100. The "providing time" denotes time during which the sensor information is provided. The "point sub-total" is calculated per sensor unit, and is a value obtained by multiplying "point giving rate" by "providing time". The "point total" is calculated per unit of vehicle ID, and is a total value of "point sub-totals".

Figure 8:
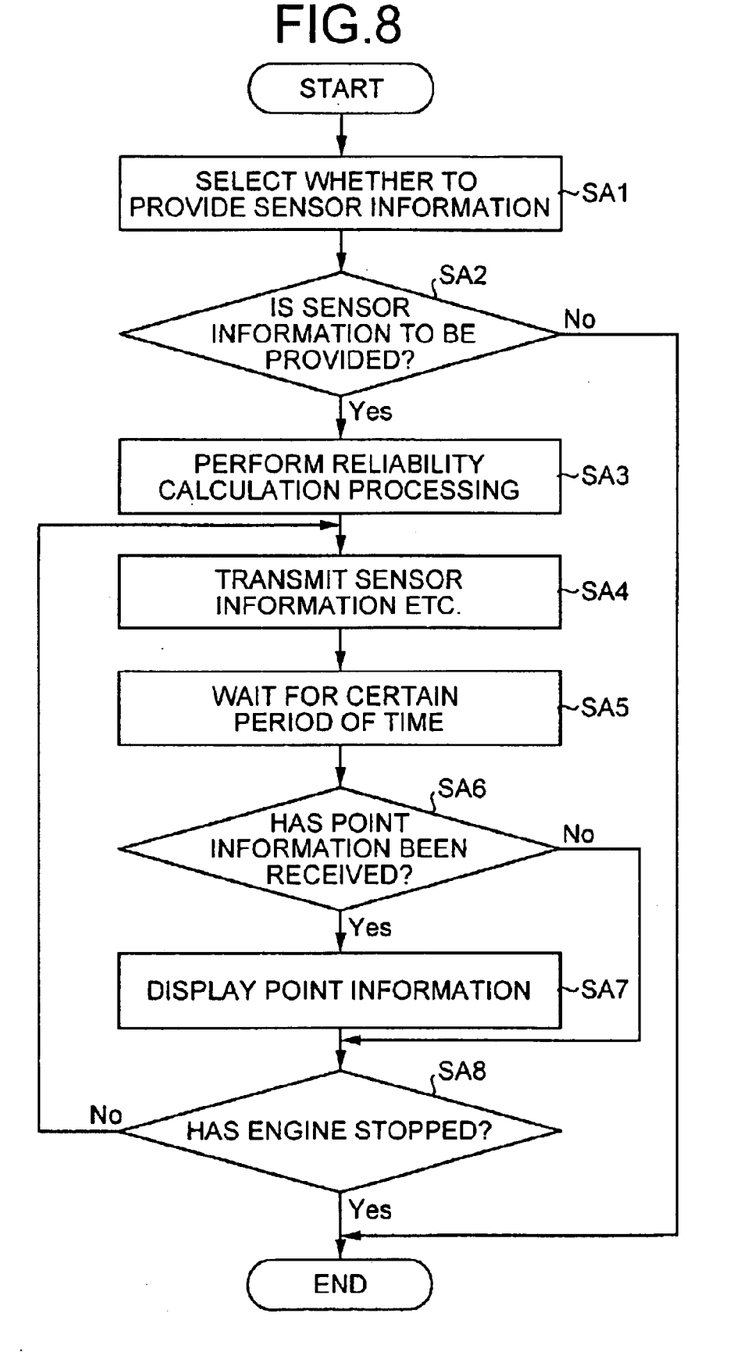
FIG. 8 is a flowchart that explains the operation of on-board devices $10_1$ to $10_n$ shown in FIG. 1.
Figure 9:
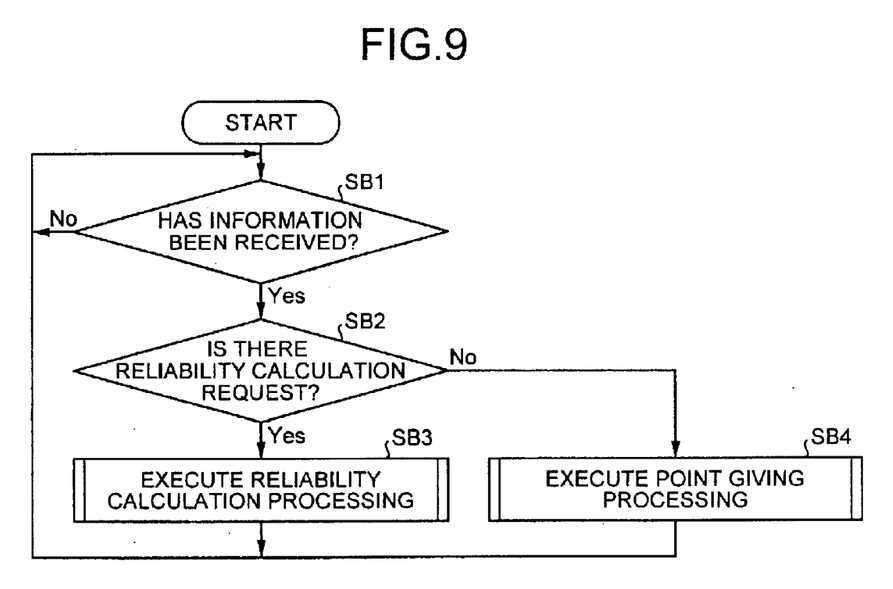
FIG. 9 is a flowchart that explains the operation of a center apparatus 60 shown in FIG. 1.

The operation in the embodiment will be explained below, with reference to the flowcharts shown in FIG. 8 to FIG. 13. FIG. 8 is a flowchart that explains the operation of on-board devices $10_1$ to $10_n$ shown in FIG. 1. FIG. 9 is a flowchart that explains the operation of the center apparatus 60 shown in FIG. 1.

The operation when the on-board device $10_1$ in the own vehicle 100 (see FIG. 2 to FIG. 4) is used will be mainly explained below. At step SB1 shown in FIG. 9, the controller 61 in the center apparatus 60 judges whether information has been received from any one of the on-board devices $10_1$ to $10_n$ via the radio communication network 25, and in this case, it judges "No", and repeats the judgment.

Figure 14:
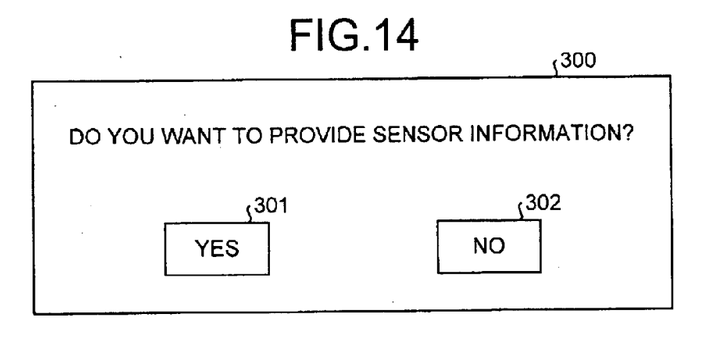
FIG. 14 shows an offer selection screen 300.

When the engine of the own vehicle 100 is activated, and power is supplied to each section of the on-board device $10_1$, at step SA1 shown in FIG. 8, the information offer selector $18_1$ allows the offer selection screen 300 shown in FIG. 14 to be displayed on the display $19_1$.

This offer selection screen 300 is a screen for the driver to select whether the respective sensor information from the respective sensors (position sensor $11_1$, . . . , other sensor group $16_1$) in the on-board device $10_1$ is to be provided to the center apparatus 60 and other on-board devices, as information, the use of which in the running support system is permitted.

In this offer selection screen 300, the driver presses a yes button 301 when he/she permits to provide the sensor information. On the other hand, the driver presses a no button 302 when he/she does not permit to provide the sensor information. The driver presses either one of the yes button 301 and the no button 302. The own vehicle 100 travels on the road 200.

At step SA2, the controller $17_1$ judges whether the yes button 301 has been pressed on the offer selection screen 300. When the no button 302 is pressed on the offer selection screen 300, the controller $17_1$ judges "No" at step SA2, and finishes the processing. Therefore, in this case, no sensor information is provided outside from the on-board device $10_1$.

On the other hand, when the yes button 301 is pressed by the driver, the controller $17_1$ judges "Yes" at step SA2, and executes the reliability calculation processing for calculating the reliability of the sensor information provided from the on-board device $10_1$ on the center apparatus 60 side.

The controller $17_1$ transmits the position information of the own vehicle 100 on the road 200 measured by the position sensor $11_1$, the reliability calculation request information, the password and the vehicle ID to the center apparatus 60 via the radio communication network 25. When these position information, reliability calculation request information, password and vehicle ID are received, the controller 61 judges "Yes" at step SB1 shown in FIG. 9.

At step SB2, the controller 61 judges whether the reliability calculation request information is included in the received information, and in this case, judges "Yes". At step SB3, the reliability calculation processing is executed.

Figure 10:
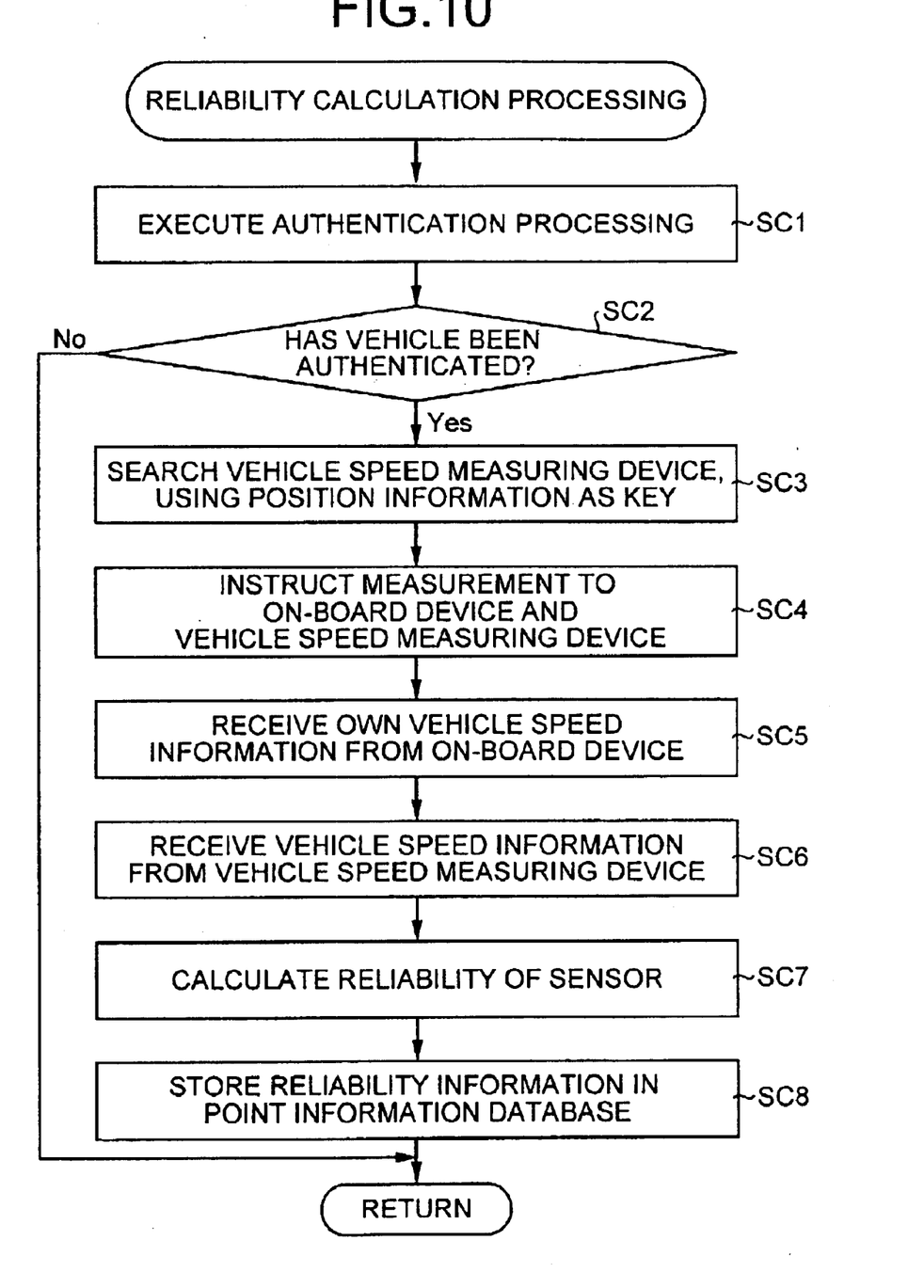
FIG. 10 is a flowchart that explains a reliability calculation processing in detail.

In the embodiment, three examples shown in FIG. 10 to FIG. 12 will be explained as the reliability calculation processing. FIG. 10 is a flowchart for calculating reliability of the sensor information from, for example, the own vehicle speed sensor $12_1$ in the own vehicle $10_1$ (own vehicle speed information), using the vehicle speed measured by any one of the vehicle speed measuring devices $30_1$ to $30_x$ shown in FIG. 2 as a reference.

Figure 11:
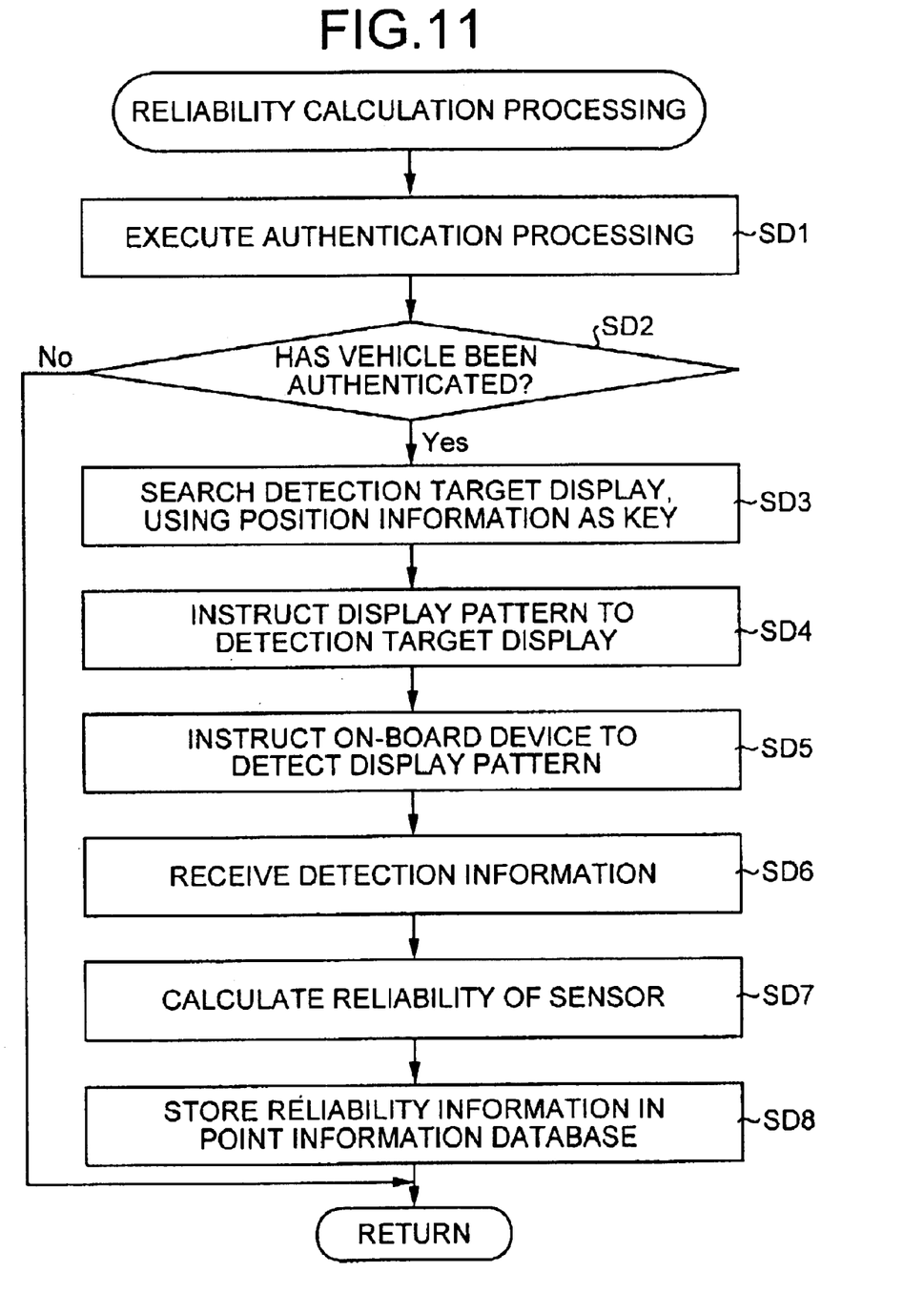
FIG. 11 is a another flowchart that explains a reliability calculation processing in detail.

FIG. 11 is a flowchart for calculating reliability of the sensor information from the visible sensor $13_1$ (or the infrared radiation sensor $14_1$) in the on-board device $10_1$, using the detection target displays $40_1$ to $40_y$ shown in FIG. 3.

Figure 12:
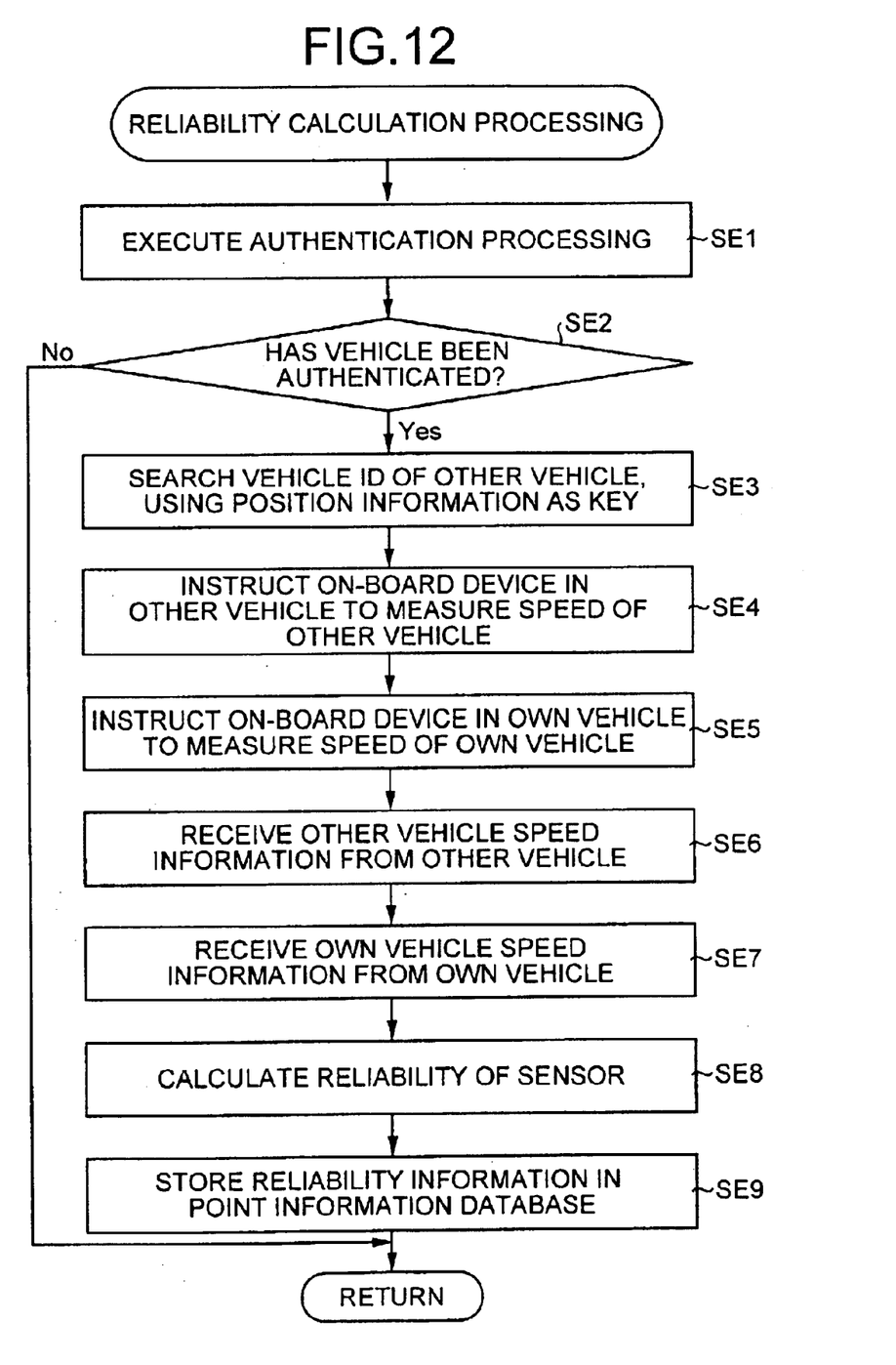
FIG. 12 is a still another flowchart that explains a reliability calculation processing in detail.

FIG. 12 is a flowchart for calculating reliability of the sensor information from, for example, the own vehicle speed sensor $12_1$ in the on-board device $10_1$(own vehicle speed information) mounted on the own vehicle 100, using the sensor information (other vehicle speed information) from the other vehicle speed sensor $15_n$ in the on-board device $10_n$ mounted on the other vehicle 110 shown in FIG. 4 as a reference.

Specifically, at step SC1 shown in FIG. 10, the vehicle identifying section 62 compares the password and the vehicle ID received from the on-board device $10_1$ with identification information database 70 (see FIG. 5), and executes the authentication processing for authenticating the vehicle (owner).

At step SC2, the vehicle identifying section 62 judges whether the vehicle has been authenticated. When the password and the vehicle ID received from the on-board device $10_1$ do not exist in the identification information database 70, the vehicle identifying section 62 judges "No" at step SC2, recognizing the authentication result as NG.

On the other hand, when the password and the vehicle ID received from the on-board device $10_1$ exist in the identification information database 70, the vehicle identifying section 62 judges "Yes" at step SC2, recognizing the authentication result as OK.

At step SC3, the controller 61 searches the vehicle speed measuring device installed at a position closest to the current position of the own vehicle 100, from the vehicle speed measuring devices $30_1$ to $30_x$ in the position information database 80 shown in FIG. 6, using the position information received from the on-board device $10_1$ as a key. In this case, it is assumed that the vehicle speed measuring device $30_1$ as shown in FIG. 2 has been searched.

At step SC4, the controller 61 instructs the on-board device $10_1$ and the vehicle speed measuring device $30_1$ to measure the speed of the own vehicle 100. Thereby, the controller $17_1$ in the on-board device $10_1$ allows the own vehicle speed sensor $12_1$ to measure the running speed of the own vehicle 100 shown in FIG. 2, and transmits the measurement result to the center apparatus 60 as the own vehicle speed information (for example, 100 km/h) via the radio communication network 25.

On the other hand, the vehicle speed measuring device $30_1$ shown in FIG. 2 measures the running speed of the own vehicle 100, and transmits the measurement result to the center apparatus 60 as the vehicle speed information (for example, 90 km/h) via the road network 50.

At step SC5, the controller 61 in the center apparatus 60 receives the own vehicle speed information (=100 km/h) from the on-board device $10_1$. At step SC6, the controller 61 receives the vehicle speed information (=90 km/h) from the vehicle speed measuring device $30_1$.

At step SC7, the reliability calculator 63 calculates the reliability of the own vehicle speed sensor $12_1$, using the own vehicle speed information (=100 km/h) and the vehicle speed information (=90 km/h) received respectively at step SC5 and step SC6.

Specifically, the reliability calculator 63 calculates a ratio between the own vehicle speed information (=100 km/h) and the vehicle speed information (=90 km/h) (however, one having a larger figure becomes denominator), and designates it as reliability (coincidence). In this case, the reliability of the own vehicle speed sensor $12_1$ becomes 0.9 (vehicle speed information (=90 km/h)/own vehicle speed information (=100 km/h)).

With regard to the reliability, as the value becomes larger (the highest value=1.0), it indicates that error in the sensor information is small, and the reliability is high.

At step SC8 shown in FIG. 10, the reliability calculator 63 stores the reliability (=0.9) calculated at step SC7, in the corresponding field of reliability (in this case, vehicle ID=2180, own vehicle speed sensor) in the point information database 90 shown in FIG. 7. The reliability calculator 63 also calculates the result obtained by multiplying the reliability by 100 as a point giving rate, and stores this point giving rate in the corresponding field in the point information database 90. Thereby, the reliability calculation processing finishes.

When the reliability of the sensor information from the visible sensor $13_1$ (or the infrared radiation sensor $14_1$) in the on-board device $10_1$ shown in FIG. 1 is to be calculated, the reliability calculation processing shown in FIG. 11 is executed, instead of the reliability calculation processing shown in FIG. 10.

Specifically, at step SD1 shown in FIG. 11, the vehicle identifying section 62 executes the authentication processing in the same manner as that at step SC1. At step SD2, the vehicle identifying section 62 judges whether the vehicle has been authenticated. In this case, the judgment result is "Yes".

At step SD3, the controller 61 searches a detection target display, installed at a position closest to the current position of the own vehicle 100, from the detection target displays $40_1$ to $40_y$ in the position information database 80 shown in FIG. 6, using the position information received from the on-board device $10_1$ as a key. In this case, it is assumed that the detection target display $40_1$ shown in FIG. 3 has been searched.

At step SD4, the controller 61 instructs a display pattern to the detection target display $40_1$, via the road network 50. Thereby, the pattern is displayed on the detection target display $40_1$. At step SD5, the controller 61 instructs the on-board device $10_1$ to detect the pattern displayed on the detection target display $40_1$, using the visible sensor $13_1$ (or the infrared radiation sensor $14_1$).

Thereby, the controller $17_1$ in the on-board device $10_1$ allows the visible sensor $13_1$ (or the infrared radiation sensor $14_1$) to detect the pattern displayed on the detection target display $40_1$ shown in FIG. 3, and transmits the pattern to the center apparatus 60 as the detection information (sensor information). As a result, at step SD6, the controller 61 receives the detection information.

At step SD7, the reliability calculator 63 calculates the coincidence between the pattern instructed at step SD4 and the detection information received at step SD6, as the reliability of the detection information (sensor information) from the visible sensor $13_1$ (or the infrared radiation sensor $14_1$).

At step SD8, the reliability calculator 63 stores the reliability calculated at step SD7, in the corresponding field of reliability in the point information database 90 shown in FIG. 7 (in this case, vehicle ID=2180, visible sensor (infrared radiation sensor)). The reliability calculator 63 also calculates the result obtained by multiplying the reliability by 100 as the point giving rate, and stores this point giving rate in the corresponding field in the point information database 90. As a result, the reliability calculation processing finishes.

When the reliability of the sensor information (own vehicle speed information) from the own vehicle speed sensor $12_1$ in the on-board device $10_1$ mounted on the own vehicle 100 is to be calculated, based on the sensor information (other vehicle speed information) from the other vehicle speed sensor $15_n$ of the on-board device $10_n$ mounted on the other vehicle 110 shown in FIG. 4, the reliability calculation processing shown in FIG. 12 is executed, instead of the reliability calculation processing shown in FIG. 10. However, it is assumed that the reliability of the sensor information used as the reference has been already calculated, and has a value equal to or higher than a threshold.

Specifically, at step SE1 shown in FIG. 12, the vehicle identifying section 62 executes the authentication processing in the same manner as that at step SC1. At step SE2, the vehicle identifying section 62 judges whether the vehicle has been authenticated. In this case, the judgment result is "Yes".

At step SE3, the controller 61 searches a vehicle ID corresponding to the vehicle running at a position closest to the current position of the own vehicle 100, from the vehicle IDs in the position information database 80 shown in FIG. 6, using the position information received from the on-board device $10_1$ as a key. In this case, it is assumed that the vehicle ID corresponding to the other vehicle 110 shown in FIG. 4 has been searched.

At step SE4, the controller 61 instructs the on-board device $10_n$ in the other vehicle 110 corresponding to the vehicle ID searched at step SE3 to measure the speed of the own vehicle 100 shown in FIG. 4.

Thereby, the controller $17_n$ in the on-board device $10_n$ allows the other vehicle speed sensor $15_n$ to measure the running speed of the own vehicle 100 shown in FIG. 4, and transmits the measurement result to the center apparatus 60 as the other vehicle speed information (for example, 90 km/h) via the radio communication network 25.

At step SE5, the controller 61 instructs the on-board device $10_1$ to measure the speed of the own vehicle 100.

Thereby, the controller $17_1$ in the on-board device $10_1$ allows the own vehicle speed sensor $12_1$ to measure the running speed of the own vehicle 100 shown in FIG. 4, and transmits the measurement result to the center apparatus 60 as the own vehicle speed information (for example, 100 km/h) via the radio communication network 25.

At step SE6, the controller 61 in the center apparatus 60 receives the other vehicle speed information (=90 km/h) from the on-board device $10_n$. At step SE7, the controller 61 receives the own vehicle speed information (=100 km/h) from the on-board device $10_1$.

At step SE8, the reliability calculator 63 calculates the reliability of the own vehicle speed sensor $12_1$, using the other vehicle speed information (=90 km/h) and the own vehicle speed information (=100 km/h) received respectively at step SE6 and step SET.

Specifically, the reliability calculator 63 calculates a ratio between the other vehicle speed information (=90 km/h) and the own vehicle speed information (=100 km/h) (however, one having a larger figure becomes denominator), and designates it as reliability (coincidence). In this case, the reliability of the own vehicle speed sensor $12_1$ becomes 0.9 (other vehicle speed information (=90 km/h)/own vehicle speed information (=100 km/h)).

At step SE9, the reliability calculator 63 stores-the reliability (=0.9) calculated at step SE8, in the corresponding field of reliability in the point information database 90 shown in FIG. 7 (in this case, vehicle ID=2180, own vehicle speed sensor). The reliability calculator 63 also calculates the result obtained by multiplying the reliability by 100 as the point giving rate, and stores this point giving rate in the corresponding field in the point information database 90. As a result, the reliability calculation processing finishes.

With regard to the sensor information from the position sensor, the other vehicle speed sensor and the like in the on-board device, the reliability is calculated based on the coincidence with the reference sensor information, in the same manner as the sensor information from the own vehicle speed sensor and the like, and the information of the reliability and the point giving rate is stored in the point information database 90.

The reliability may be set uniformly, corresponding to the life cycle of each sensor in the on-board device. In this case, as the life cycle becomes longer, the reliability becomes lower (for example, the reliability becomes lower by 0.1 per one year of the life cycle). In the embodiment, a mean value of the reliability is calculated for each of plural pieces of sensor information in the on-board device, and this mean value may be designated as a representative reliability.

When the reliability calculation processing at step SA3 shown in FIG. 8 is finished, at step SA4, the controller $17_1$ transmits (provides) the sensor information measured by each sensor (the position sensor $11_1$, . . . , the other sensor group $16_1$), the password and the vehicle ID to the center apparatus 60. At step SA5, the controller $17_1$ waits for a certain period of time.

When these sensor information, password and vehicle ID are received by the center apparatus 60, the controller 61 judges "Yes" at step SB1 shown in FIG. 9.

At step SB2, the controller 61 judges whether the reliability calculation request information is included in the received information, and in this case, it judges "No". At step SB4, the point giving processing is executed for giving points corresponding to the reliability and the providing time of the sensor information.

Figure 13:
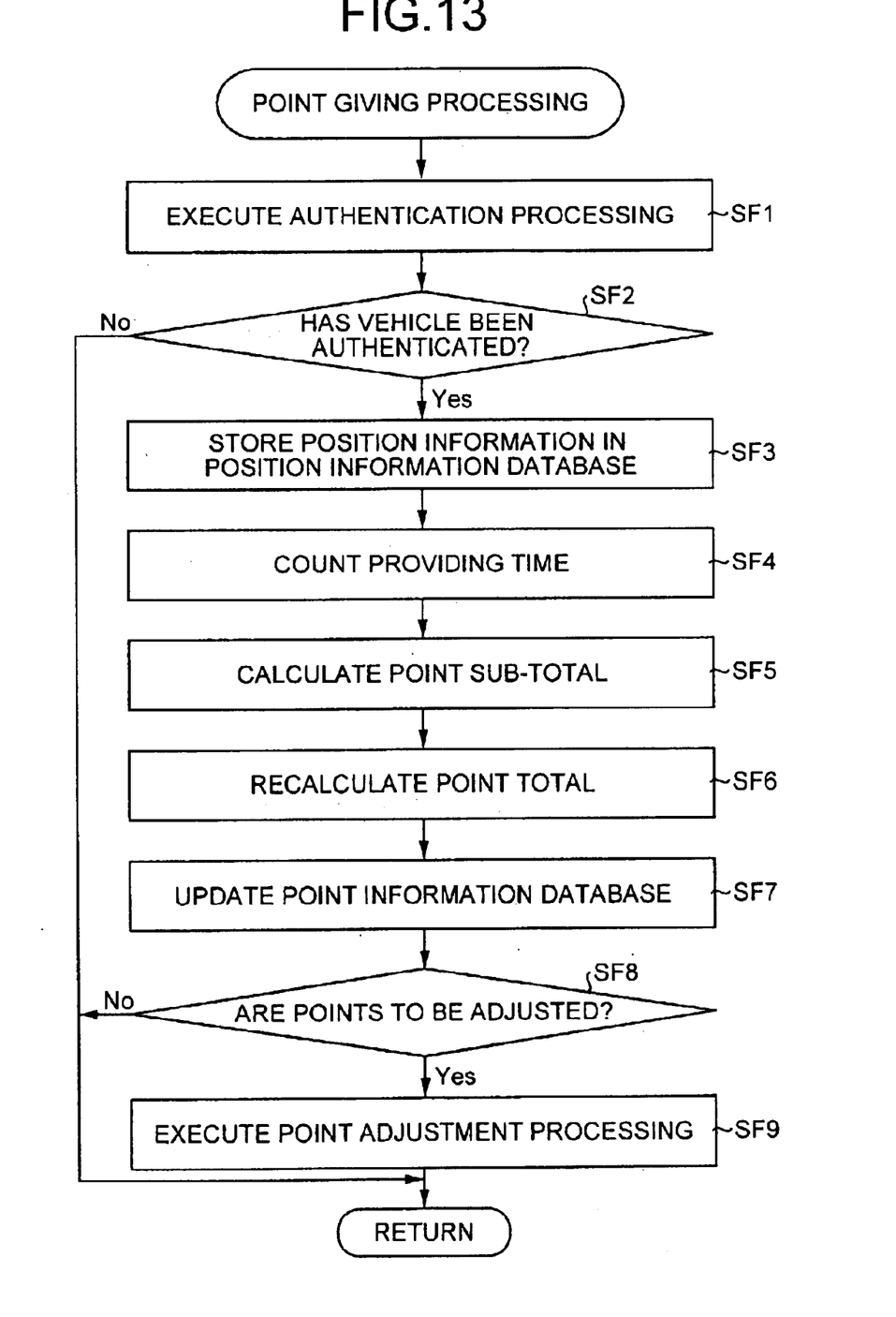
FIG. 13 is a flowchart that explains a point giving processing shown in detail.

Specifically, at step SF1 shown in FIG. 13, the vehicle identifying section 62 compares the password and the vehicle ID received from the on-board device $10_1$ with the identification information database 70 (see FIG. 5) in the same manner as at step SC1, and executes the authentication processing for authenticating the vehicle (owner).

At step SF2, the vehicle identifying section 62 judges whether the vehicle has been authenticated, and in this case, it judges "Yes". At step SF3, the controller 61 stores the position information of the sensor information from the on-board device $10_1$ in the position information database 80, using the vehicle ID as a key, and updates the position information of the vehicle.

At step SF4, the controller 61 counts the providing time of each provided sensor information, and stores the count result in the "providing time" in the point information database 90 (see FIG. 7). The controller 61 uses the provided sensor information in the running support system.

Only the sensor information having reliability equal to or higher than the threshold in the point information database 90, of the provided sensor information, is used in the running support system, and sensor information having reliability lower than the threshold may not be used. Furthermore, the point giving rate (see FIG. 7) corresponding to the sensor information having reliability lower than the threshold may be designated as 0.

At step SF5, the point giving section 64 multiplies the point giving rate by the providing time for each sensor shown in FIG. 7, relating to the provided sensor information, and these points are designated as sub-total of the points. At step SF6, the point giving section 64 totalizes the sub-totals corresponding to the vehicle ID shown in FIG. 7, and (re-)calculates these as a point total.

At step SF7, the point giving section 64 stores the calculation result (point sub-totals and point total) at step SF5 and step SF6 in the point information database 90 shown in FIG. 7.

At step SF8, the point notifying section 65 judges whether it is a timing of point adjustment (for example, end of the month), and when this judgment result is "No", control returns to the main routine shown in FIG. 9.

On the other hand, when the judgment result at step SF8 is "Yes", at step SF9, the point notifying section 65 executes the point adjustment processing. Specifically, the point notifying section 65 reads out the point total (=4800) corresponding to the vehicle ID (in this case, 2180) from the point information database 90, and notifies the on-board device $10_1$ of the point information relating to this point total via the radio communication network 25.

After having performed adjustment, such as transferring money corresponding to the point total to a bank account of the information provider, the point notifying section 65 deletes the information of the providing time relating to the adjusted points and information of the point sub-totals and point total from the point information database 90.

At step SA6 shown in FIG. 8, the controller $17_1$ of the on-board device $10_1$ judges whether the point information has been received from the center apparatus 60. In this case, if the point information has been received, the controller $17_1$ judges "Yes" at step SA6.

Figure 15:
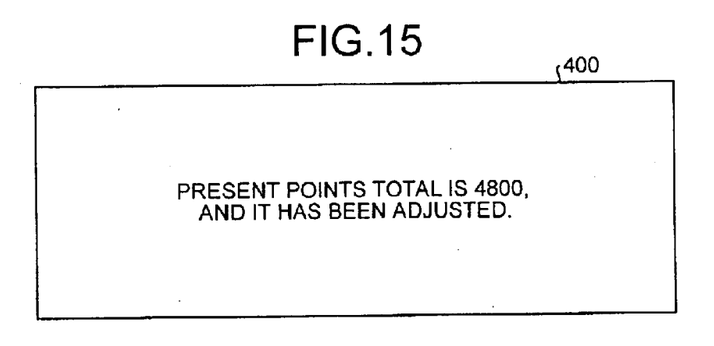
FIG. 15 shows a point notification screen 400.

At step SA7, the controller $17_1$ displays the point notification screen 400 shown in FIG. 15 on the display $19_1$, based on the point information from the center apparatus 60. On this point notification screen 400, the adjusted point total (=4800) is displayed. Thereby, the information provider (driver) recognizes that the provided sensor information has been turned into points.

At step SA8, the controller $17_1$ judges whether the engine has been stopped, and in this case, it judges "No". If the judgment result at step SA8 is "Yes", a series of processing finishes. Thereafter, step SA4 onward is executed, and the sensor information is provided from the on-board device $10_1$ to the center apparatus 60 at every certain period of time. On the other hand, when the judgment result at step SA6 is "No", processing at step SA8 is executed.

Every time when the reliability of the sensor information is calculated, the center apparatus 60 may transmit the sensor information and the information of reliability to the on-board device, to notify the information provider (driver) of the sensor information and the reliability.

An example in which the point giving rate is multiplied by the providing time is explained here as the calculation method of the point sub-total shown in FIG. 7, but as another calculation method, the point giving rate may be multiplied by the providing frequency (the number of times when the sensor information is provided).

As explained above, according to the embodiment, for example, the driver selects whether the sensor information from the on-board device $10_1$ is to be provided to the center apparatus 60, using the offer selection screen 300 (see FIG. 14), and the sensor information, the provision of which has been permitted, is provided to the center apparatus 60. Therefore, it can be prevented that the sensor information is used without permission, and the driver is motivated to willingly provide the sensor information.

According to the embodiment, the information of points given corresponding to the reliability of the sensor information provided to the center apparatus 60 is received from the center apparatus 60, and the points are notified to the driver. As a result, the driver can be motivated to willingly provide the sensor information, for obtaining points.

According to the embodiment, since the information of points is notified to the driver, the driver recognizes that he/she has obtained points every time when the points are given. As a result, motivation for the driver to willingly provide the sensor information can be intensified.

According to the embodiment, for example, the reliability of the sensor information is calculated based on the sensor information provided from the on-board device $10_1$ with permission of the driver and the vehicle speed information (reference information) from the vehicle speed measuring device $30_1$ shown in FIG. 2, and the sensor information is used for the running support system for vehicles. As a result, it is prevented that the sensor information is used without permission, and the reliability of the sensor information is ensured.

The embodiment of the present invention has been explained in detail with reference to the drawings, but the specific configuration example is not limited to the embodiment, and design changes without departing from the scope of the present invention is included in the present invention.

Figure 16:
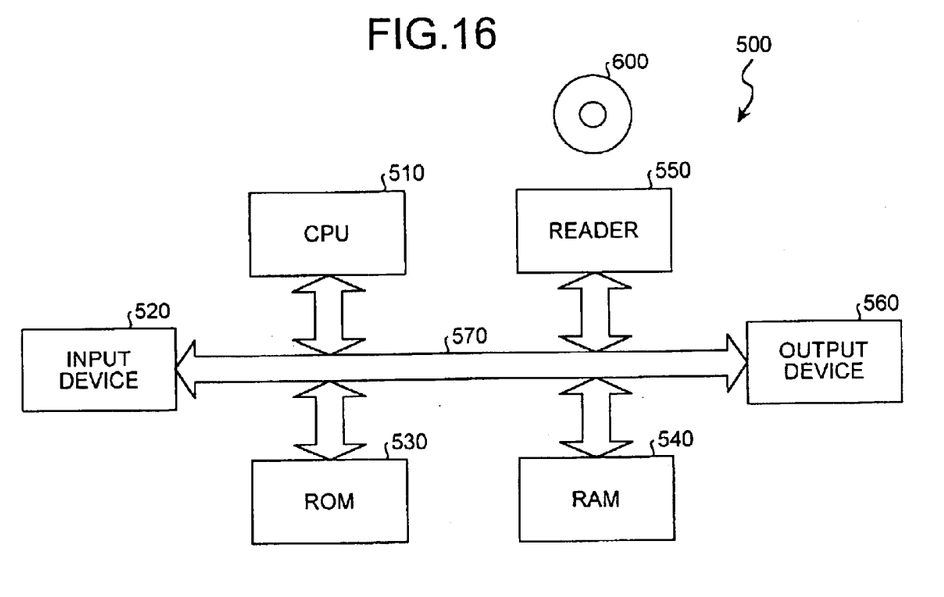
FIG. 16 is a block diagram that shows a modification example of the embodiment.

For example, a program for realizing the functions of the on-board device $10_1$ to $10_n$ or the center apparatus 60 is recorded on a computer readable recording medium 600 shown in FIG. 16, and the program recorded on the recording medium 600 may be read by a computer 500 shown in FIG. 16, and executed to thereby realize each function.

The computer 500 shown in FIG. 16 comprises a CPU (Central Processing Unit) 510 that executes the program, an input device 520 such as a keyboard and a mouse, a ROM (Read Only Memory) 530 for storing various data, a RAM (Random Access Memory) 540 for storing calculation parameters and the like, a reader 550 that reads the program from the recording medium 600, an output device 560 such as a display and a printer, and a bus 570 for connecting each section of the apparatus.

The CPU 510 reads the program stored on the recording medium 600 via the reader 550, and executes the program, to thereby realize the functions. The recording medium 600 includes an optical disk, a flexible disk and a hard disk.

According to the present invention, a driver selects whether to provide the sensor information from an on-board sensor to an external system, and the sensor information, the provision of which has been permitted, is provided to the external system. Therefore, such a situation that the sensor information is used without permission can be prevented, and there is the effect that the driver is motivated to provide the sensor information willingly.

Moreover, information of privilege points given corresponding to the reliability of the sensor information provided to the external system is received from the external system, and the privilege points are notified to the driver. Therefore, there is the effect that the driver is motivated to willingly provide the sensor information for obtaining the privilege points.

Furthermore, the reliability of the sensor information is calculated based on the sensor information provided from the on-board sensor information providing apparatus with permission of the driver, and reference information, and the sensor information is used for vehicle running support. As a result, it is prevented that the sensor information is used without permission, and there is the effect that the reliability of the sensor information can be ensured.

Moreover, since privilege points are given to the driver corresponding to the reliability, there is the effect that the driver is motivated to willingly provide the sensor information for obtaining the privilege points.

Furthermore, since the privilege point information is notified to the driver, the driver can know the acquisition of privilege points every time when the privilege points are given. As a result, there is the effect that motivation for the driver to willingly provide the sensor information can be intensified.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An on-board sensor information providing program that allows a computer to function as:

an acquisition unit that acquires sensor information used for vehicle running support from a sensor mounted on-board a vehicle;

a selection unit that allows a driver of the vehicle to select whether to provide the sensor information to an external system;

an offer unit that provides the sensor information, the provision of which has been permitted by the driver, to the external system; and a notification unit that receives information of privilege points given corresponding to a reliability of the sensor information provided to the external system, from the external system, and notifies the driver of the privilege points.

2. The on-board sensor information providing program according to claim 1, wherein the notification unit receives the reliability information in addition to the privilege points from the external system, and notifies the driver of the privilege points and the reliability.

3. The on-board sensor information providing program according to claim 1, wherein the reliability is calculated based on a result of comparison between the reference sensor information obtained from a reference sensor installed on a road on which the vehicle is driven, and the sensor information provided to the external system.

4. The on-board sensor information providing program according to claim 1, wherein the reliability corresponds to a read result of a display pattern provided on a road on which the vehicle is driven, and is calculated based on the sensor information provided to the external system.

5. The on-board sensor information providing program according to claim 1, wherein the reliability is calculated based on a result of comparison between the reference sensor information obtained from a reference sensor mounted on another vehicle, and the sensor information provided to the external system.

6. The on-board sensor information providing program according to claim 1, wherein the privilege points are given to the sensor formation having reliability equal to or higher than a threshold.

7. An on-board sensor information providing apparatus, comprising:
    an acquisition unit that acquires sensor information used for vehicle running support from a sensor mounted on-board a vehicle;
    a selection unit that allows a driver of the vehicle to select whether to provide the sensor information to an external system;
    an offer unit that provides the sensor information, the provision of which has been permitted, to the external system; and
    a notification unit that receives information of privilege points given corresponding to a reliability of the sensor information provided to the external system, from the external system, and notifies the driver of the privilege points.

8. The on-board sensor information providing apparatus according to claim 7, wherein the notification unit receives the reliability information in addition to the privilege points from the external system, and notifies the driver of the privilege points and the reliability.

9. An on-board sensor information providing method, comprising:
    acquiring sensor information used for vehicle running support from a sensor mounted on-board a vehicle;
    allowing a driver of the vehicle to select whether to provide the sensor information to an external system;
    providing the sensor information, the provision of which has been permitted, to the external system; and
    receiving information of privilege points given corresponding to a reliability of the sensor information provided to the external system, from the external system, and notifying the driver of the privilege points.

10. An on-board sensor information using program that allows a computer to function as:
    a reception unit that receives sensor information from an on-board sensor information providing apparatus, the on-board sensor information providing apparatus having
        an acquisition unit that acquires the sensor information used for vehicle running support from a sensor mounted on-board a vehicle;
        a selection unit that allows a driver of the vehicle to select whether to provide the sensor information to an external system; and
        an offer unit that provides the sensor information, the provision of which has been permitted by the driver, to the external system;
    a reliability calculation unit that calculates a reliability of the sensor information based on the sensor information provided to the external system and reference information;
    a use unit that uses the sensor information for supporting running of the vehicle on a road; and
    a privilege point giving unit that gives privilege points corresponding to the reliability with respect to the driver.

11. The on-board sensor information using program according to claim 10, further allowing the computer to function as a notification unit that notifies the driver of the privilege point information.

12. The on-board sensor information using program according to claim 11, wherein the notification unit notifies the driver of the privilege points and the reliability.

13. The on-board sensor information using program according to claim 10, wherein the reliability calculation unit calculates the reliability based on a result of comparison between the reference information obtained from a reference sensor installed on the road and the sensor information provided to the external system.

14. The on-board sensor information using program according claim 10, wherein the reliability calculation unit calculates the reliability corresponding to a read result of a display pattern provided on the road, based on the sensor information provided to the external system and the display pattern as the reference information.

15. The on-board sensor information using program according to claim 10, wherein the reliability calculation unit calculates the reliability based on a result of comparison between the reference information obtained from a reference sensor installed on another vehicle on the road and the sensor information provided to the external system.

16. The on-board sensor information using program according to claim 10, wherein the privilege point giving unit gives the privilege points to the sensor information that has a reliability equal to or higher than a threshold.

17. The on-board sensor information using program according to claim 13, wherein the privilege point giving unit gives the privilege points to the sensor information that has a reliability equal to or higher than a threshold.

18. The on-board sensor information using program according to claim 14, wherein the privilege point giving unit gives the privilege points to the sensor information that has a reliability equal to or higher than a threshold.

19. The on-board sensor information using program according to claim 15, wherein the privilege point giving unit gives the privilege points to the sensor information that has a reliability equal to or higher than a threshold.

20. An on-board sensor information using apparatus comprising:
    a reception unit that receives sensor information from an on-board sensor information providing apparatus, the on-board sensor information providing apparatus having
        an acquisition unit that acquires the sensor information used for vehicle running support from a sensor mounted on-board a vehicle;
        a selection unit that allows a driver of the vehicle to select whether to provide the sensor information to an external system; and
        an offer unit that provides the sensor information, the provision of which has been permitted by the driver, to the external system;
    a reliability calculation unit that calculates a reliability of the sensor information based on the sensor information provided to the external system and reference information;
    a use unit that uses the sensor information for supporting running of the vehicle on a road; and
    a privilege point giving unit that gives privilege points corresponding to the reliability with respect to the driver.

21. The on-board sensor information using apparatus according to claim 20, further comprising a notification unit that notifies the driver of the privilege point information.

22. An on-board sensor information using method comprising:
- receiving sensor information from an on-board sensor information providing apparatus, the on-board sensor information providing apparatus having
  - an acquisition unit that acquires the sensor information used for vehicle running support from a sensor mounted on-board a vehicle;
  - a selection unit that allows a driver of the vehicle to select whether to provide the sensor information to an external system; and
  - an offer unit that provides the sensor information, the provision of which has been permitted by the driver, to the external system;
- calculating a reliability of the sensor information based on the sensor information provided to the external system and reference information;
- using the sensor information for supporting running of the vehicle on a road; and
- giving privilege points corresponding to the reliability with respect to the driver.

23. The on-board sensor information providing program according to claim 1, wherein the sensor information includes at least one of a speed information, a road information, a distance information, and an information about obstacles obtained by sensors.

24. The on-board sensor information providing apparatus according to claim 7, wherein the sensor information includes at least one of a speed information, a road information, a distance information, and an information about obstacles obtained by sensors.

25. The on-board sensor information providing method according to claim 9, wherein the sensor information includes at least one of a speed information, a road information, a distance information, and an information about obstacles obtained by sensors.

26. The on-board sensor information using program according to claim 10, wherein the sensor information includes at least one of a speed information, a road information, a distance information, and an information about obstacles obtained by sensors.

27. The on-board sensor information using apparatus according to claim 20, wherein the sensor information includes at least one of a speed information, a road information, a distance information, and an information about obstacles obtained by sensors.

28. The on-board sensor information using method according to claim 22, wherein the sensor information includes at least one of a speed information, a road information, a distance information, and an information about obstacles obtained by sensors.

29. An apparatus comprising:
- an on-board sensor mounted on a vehicle to obtain sensor information related to the vehicle;
- an acquisition unit to acquire the sensor information from the on-board sensor of the vehicle;
- a selection unit to allow a driver of the vehicle to determine whether to provide the sensor information from the acquisition unit to an external system;
- an offer unit to provide the sensor information to the external system based upon the determination of the driver in the selection unit, to provide the sensor information from the acquisition unit to the external system; and
- a notification unit that receives information of privilege points given corresponding to a reliability of the sensor information provided to the external system, from the external system, and notifies the driver of the privilege points.

30. A method comprising:
- obtaining sensor information from an on-board sensor of a vehicle;
- determining whether to provide the obtained sensor information to an external system;
- providing the obtained sensor information to the external system based upon the determination; and
- receiving information of privilege points given corresponding to a reliability of the sensor information provided to the external system, from the external system, and notifying a driver of the vehicle, of the privilege points.

31. A method comprising:
- means for obtaining sensor information from an on-board sensor of a vehicle;
- means for determining whether to provide the obtained sensor information to an external system;
- means for providing the obtained sensor information to the external system based upon the determination; and
- means for receiving information of privilege points given corresponding to a reliability of the sensor information provided to the external system, from the external system, and notifying a driver of the vehicle, of the privilege points.

* * * * *

UNITED STATES PATENT AND TRADEMARK OFFICE
CERTIFICATE OF CORRECTION

PATENT NO. : 6,922,651 B2
DATED : July 26, 2005
INVENTOR(S) : Toshio Endoh

It is certified that error appears in the above-identified patent and that said Letters Patent is hereby corrected as shown below:

Column 13,
Line 11, change "formation" to -- information --.

Column 14,
Line 18, change "according" to -- according to --.

Signed and Sealed this

Thirteenth Day of June, 2006

JON W. DUDAS
*Director of the United States Patent and Trademark Office*